United States Patent Office 3,846,235
Patented Nov. 5, 1974

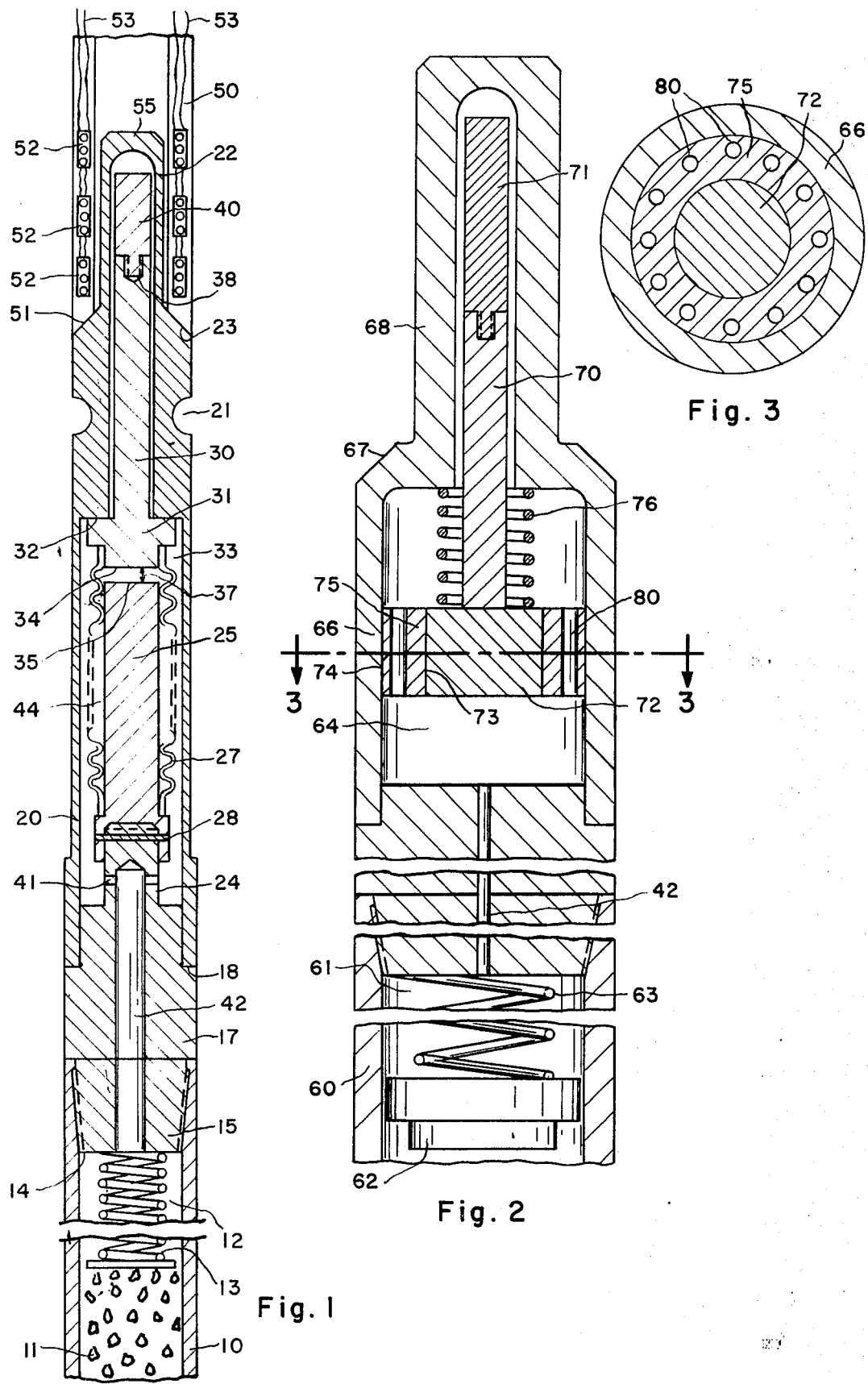

3,846,235
FAILURE INDICATOR FOR NUCLEAR REACTOR FUEL ELEMENT
Cecil R. Jones, Orange, Conn., Arthur J. Goldman, White Plains, N.Y., and D. Garth Rowe, San Jose, Calif., assignors to Transfer Systems, Incorporated, North Haven, Conn.
Filed Nov. 3, 1972, Ser. No. 303,548
Int. Cl. G21c 3/18, 17/06
U.S. Cl. 176—80        12 Claims

ABSTRACT OF THE DISCLOSURE

An improved failure indicator for a nuclear reactor fuel element is described. The failure indicator features a movable indicator pin maintained under constant spring pressure toward a failure position but maintained in a safe position by internal fuel pressurization or a corrodible member. The indicator pin is totally enclosed and isolated from the coolant environment. A magnetic member is connected to the indicator pin and its position is magnetically sensed to determine failed fuel. A feature of the construction is the avoidance of pressure-tight structural seals between dissimilar materials.

---

The invention relates to an improved failure indicator for a fuel element for a power-generating nuclear reactor.

In our prior copending application, Ser. No. 251,016, filed May 8, 1972, we describe a novel failure indicator for fuel elements useful in power-generating nuclear reactors. This failure indicator comprises a spring-biased movable pin which protrudes above the top of the fuel element so long as the fuel element sheath or containment remains intact maintaining an internal pressurized condition exceeding that of the fuel element environment. Should the fuel container integrity be breached, either by pinholes or major ruptures, the internal pressurization is lost and the spring-biased pin retracts. Sensing of the protruded or retracted pin position enables one to determine the internal pressure condition of the fuel element, and thus establish failed fuel. As mentioned in our prior application, a preferred sensor is a linear variable differential transformer (LVDT), available commercially, which is adapted to sense small physical displacements of an object contacted by the LVDT sensor. An important feature of the prior application is that a single apparatus can be provided capable of simultaneously sensing the positions of a plurality of indicator pins on the top of plural fuel elements in an assembly of fuel elements, while the assembly remains in the reactor core or after removal. This is important to reduce the shut-down time required to locate and replace failed fuel elements whose presence has been noted by for example an increase in off-gas activity. It will be noted that current reactor designs employ fuel assemblies each containing 64 fuel elements in the form of elongated rods or pins, and a typical core would have provision for about 600–800 assemblies, producing a grand total of the order of 40,000 fuel rods. One skilled in the art could well appreciate the time required to individually sense the position of the indicator pin in some 40,000 separate fuel rods.

The present invention is an improvement over the fuel element failure indicator described in our prior application. One form of the improved version of the present invention still provides a positively biased movable pin whose position is determined by an internal pressure condition of the fuel element which changes upon any loss in the integrity of the fuel element containment. But, the improved version affords a number of additional constructional features which greatly simplify its manufacture and provide increased safety against malfunction of the indicator or fuel failure due to failure of the indicator containment.

This is achieved, in accordance with one feature of the invention, with a movable pin construction which is entirely contained within a surrounding pressure-tight containment. Preferably the movable pin extends within a cylindrical containment extension of reduced diameter extending upward from the upper end of the fuel element. Since the pin is completely enclosed, its position cannot be mechanically sensed by the LVDT instrument sensor described in our prior application, but we have modified the LVDT probe to enable it to sense a physical displacement of a portion of the indicator pin when constructed of ferro-magnetic material. The reduced diameter cylindrical extension is important to align and locate a hollow LVDT probe relative to the ferromagnetic portion of the indicator pin and also provides a clearance zone for accommodating the probe even while the fuel element is within a fuel assembly and thus closely surrounded by neighboring fuel elements.

In accordance with a further feature of the invention, the construction of the containment-surrounded indicator pin and its biasing means is such as to eliminate the need for pressure-tight, structural joints between dissimilar materials.

Still another feature of the invention is a construction which isolates the environment to which the exterior of the indicator pin is exposed from the environment to which the fuel element as a whole is exposed. In this manner, complete control over the pin displacement can be achieved.

Still a further feature of the invention is a positively-biased movable pin construction which is responsive to a moisture condition occurring on failure of the fuel element containment. In this construction, the movable pin is biased against an element structurally maintained by a corrodible member made up of metal subject to accelerated corrosion when in a stressed condition and exposed to moisture.

The various embodiments of the invention also allow simultaneous failure sensing of multiple fuel elements even in their assembled condition and thus enables the time required for sensing of the assembled fuel elements and many such assemblies to be greatly reduced.

These and further features and advantages of the invention will be best understood from the following detailed description of several exemplary embodiments thereof taken in conjunction with the accompanying drawings wherein:

FIG. 1 is a cross-sectional view of one end of a fuel element containing one form of failure indicator in accordance with the invention;

FIG. 2 is a cross-sectional view similar to FIG. 1 of a modification, and FIG. 3 is a cross-sectional view along line 3—3.

Reference is made to our earlier filed copending application, Ser. No. 251,016, the contents of which are hereby incorporated herein by reference, for a detailed description of the construction of typical fuel elements for nuclear reactors, the assembly and core environment in which they function, and the reasons for failure and why it is important quickly to detect and replace failed fuel elements. The presence of a failed fuel element in the core can be indicated by an increase in off-gas activity which is conventionally continuously monitored, but this does not single out the specific failed fuel element or elements. In our earlier application, this was indicated by a protruding pin at the top of fuel element. In the present invention, the indicator pin is completely enclosed. The description that hereinafter follows will concentrate on the failure indicator mechanism of the fuel element and its differences with respect to our earlier invention and the important advantages realized because of those differences.

FIG. 1 illustrates one form of failure indicator in accordance with the present invention, the remainder of the fuel element which extends a considerable distance below the upper end not being shown. As is well known, a typical fuel rod or fuel pin configuration comprises a corrosion-resistant cylindrical sheath or containment 10 of, for example, a zirconium alloy or stainless steel which contains packed within it pellets 11 of suitable reactor fuel, such as uranium dioxide. A typical configuration has a length of about 12 feet and a diameter of about one-half inch. A number of such fuel rods are formed into an assembly of, for example, 8 x 8 totalling 64 rods, and in a typical installation about 600–800 of such assemblies constitute the reactor core. The rods are spaced apart and held in the assembly by upper and lower spacer grids to form in a typical array an edge-edge spacing of about one-quarter inch. As shown in FIG. 1, inside a gas plenum 12 of the fuel rod is a spring 13 which bears against the fuel pellets 11 at its bottom side and against a shoulder 14 at its top side.

In this instance, the shoulder 14 is formed by a plug 15 for the cylinder end, which also constitutes the base 17 of an indicator mechanism, which plug 15 is sealed, as by welding, to the upper end of the fuel containment 10. The base 17 narrows at its top to form a shoulder 18 for receiving an indicator containment in the form of a cylindrical tube 20 secured, as by welding, to the base and extending upward therefrom to define, first, an annular groove 21 used for gripping purposes by a suitable removal tool (not shown) for removing the fuel rod from its assembly, and, second, an upward cylindrical extension 22 of reduced width or diameter extending from a tapered locating shoulder 23 and closed off at the top. The reduced-diameter extension 22 may have, for example, a diameter of about one-half that of the wider section 20 extending below it.

The indicator base 17 also has on the interior of the indicator containment a short upstanding post 24 on which is mechanically supported a center stop member 25 to which is secured at its bottom, as by welding, a flexible bellows 27 having spring characteristics. The mechanical joint between the center stop 25 and the post 24 may be, as is shown by way of example, a pin 28 which extends in a press fit through aligned holes in the post and a cylindrical socket end of the stop 25.

The upper end of the bellows 27 is secured, as by welding, to the bottom of an indicator element in the form of a movable pin 30 whose lower end includes a widened base portion 31 with a shoulder 32 enclosed within an outer chamber 33 defined by the enlarged diameter containment section 20, and whose upper end extends up into the section of reduced diameter 22. The indicator pin 30 is vertically movable from a safe-fuel position wherein the bottom surface 34 of the pin contacts the top surface 35 of the stop 25, to a failed-fuel position, as shown in FIG. 1, wherein the upward movement is stopped by the shoulder 32. The total movement is indicated in FIG. 1 by the vertical arrow labelled 37. To the upper end of the indicator pin 30 is mechanically secured, as for example, by a threaded joint 38 as shown, a ferromagnetic member 40, for example, a soft magnetic member made for instance of type 400 stainless steel. The magnetic member 40 extends entirely within the reduced-diameter section 22. As will be observed, the gas plenum 12 of the fuel rod communicates with the outer chamber 33 which surrounds the bellows 27 via openings 41 in the base post and an opening 42 extending entirely through the base. The outer chamber 33 also includes the volume within the section of reduced diameter. A second inner chamber 44, which is pressure-tight, is formed within the bellows 27 and includes the center stop 25. The bellows 27 itself is constructed of spring steel to exert on the indicator pin 30 a certain upward force tending to push the pin upwardly toward its failed-fuel position. The inner chamber 44 would normally contain atmospheric pressure, because the subassembly of center stop 25, bellows 27 and indicator pin 30 would be carried out in a normal factory environment at atmospheric pressure. However, the fuel rod itself during final assembly is pressurized to a pressure considerably above atmospheric. This means that the pressure in the outer chamber 33 is super atmospheric, tending to push the indicator pin downward. The combination of inner and outer chamber pressures and bellows spring tension are chosen such that: (a) the net force acting on the indicator pin 30 is downward forcing it into its safe-fuel position so long as the fuel rod pressurization exceeds by a fixed amount that of the inner chamber, and (b) the net force acting on the indicator pin is upward forcing it into its failed-fuel position when the internal fuel rod pressurization falls below the fixed amount excess over the inner chamber pressure.

In the simplest case, the fixed amount can be any amount in excess of atmospheric pressure, which is roughly the reactor core coolant pressure at shutdown when the fuel elements will be sensed. Thus, should a leak develop in the fuel element containment whereby its pressurization falls to that (atmospheric) of the surrounding coolant at shutdown, then the bellows spring pressure which is a positive value would drive the indicator pin to its up, failed-fuel position. In a typical BWR installation, the coolant pressure is about 1000 p.s.i. during operation but nearly atmospheric during shutdown, and the fuel element is internally pressurized to about 200–300 p.s.i. but which increases during burnup to a higher value due to the release of gaseous fission products. The spring bellows can be chosen to exert an upward pressure of about 2–3 times atmospheric. Hence, with the fuel containment integrity maintained, the net force on the indicator pin is downward due to the pressure difference between outer 33 and inner 44 chambers considerably exceeding that of the spring bellows 27. However, upon loss or reduction of the fuel rod internal pressurization, the bellows spring force predominates and drives the indicator pin upward.

One of the important improvements of a fuel element failure indicator in accordance with our present invention over our earlier construction is the provision of a pressure-tight housing completely enclosing the indicator pin 30 and the bellows, thereby entirely separating the latter from the core environment. This construction ensures fuel rod integrity even if the bellows were to fail, a result not possible in our earlier construction. Another important advantage is the elimination of pressure-tight joints between dissimilar materials. In our earlier construction, seals were needed between, for example, stainless steel and zircalloy, a zirconium alloy. While such joints can be achieved by welding or brazing, they are subject to failure which therefore may reduce production yields or the lifetime of the unit. In the present construction, all exposed surfaces can be constituted of the same corrosion-resistant material, and where joints between dissimilar materials are required, such joints need not be pressure tight and therefore a mechanical connection can be employed. For instance, the fuel rod enclosure 10, indicator base 17, and failure indicator enclosure 20, 23 can all be of zircalloy, and thus readily welded together. The indicator pin 30, the indicator pin stop 25, and the bellows 27 may all be constituted of, for example, type 300 stainless steel; thus the joints between the bellows 27 and the indicator pin 30 and stop 25 are readily achieved by welding. As mentioned previously, the joints between the magnetic member 40 and the underlying pin 30, and that between the pin stop 25 and the supporting post 24 can be of a mechanical nature.

Another advantage of the construction of FIG. 1 is that one has available a large choice of pressure conditions to obtain the desired mode of operation. As mentioned, the initial pin position and time of movement is determined by the choice of internal pressurization of the fuel element, the bellows spring pressure, and the incorcation, the corrodible member 75 becomes exposed to corrodents only after failure of the fuel element sheath, and thus is designed to fail fairly quickly once exposed to the corrodents, in order to enable early replacement of the failed fuel element. This more rapid failure is readily accomplished by, for example, reducing the density of the corrodible member, increasing the size of the holes to reduce the cross-section of the ligaments between the holes and thus the number of grains in the member which maintain its integrity, or increasing the spring pressure and thus the stress on the corrodible member, or any combination of these parameters, all of which accelerate failure thereof. Other factors explained in greater detail in said copending aplication can also be manipulated to bring about the desired time to failure.

The embodiment of FIG. 2 is sensed in the same manner as that of FIG. 1, and can also be located at the bottom end of the fuel element.

Both embodiments of FIGS. 1 and 2 are adapted for multiple testing of plural fuel elements while in an assembly by the same or similar multiple sensing mechanism illustrated in FIG. 4 of our earlier copending application, the only change being required is to substitute the LVDT probe illustrated in FIG. 1 herein for that used in the copending application. To ensure accurate location of the sensing proble relative to the ferromagnetic member for each fuel element in the multiple sensing mechanism, it is preferred after the fuel elements have been positioned in their assemblies to apply the multiple sensing mechanism and then record the differential voltage generated by each LVDT probe for each individual fuel element. Thereafter, when the same sensing mechanism is reapplied to the assembly, it is very easy to determine movement of the ferromagnetic members from a comparison of the generated voltages to that initially recorded, affording a very sensitive means for indicating even small movements of any ferromagnetic member of any particular fuel element.

As will be observed, the improved failure indicator described herein affords the improvement over our earlier construction of providing a pressure-tight housing around the movable indicator pin to insure fuel rod integrity even if the bellows were to fail. Even if the latter should occur, the fuel element is no less reliable than existing units, since conventional radio-chemical techniques can still be used to detect fuel failure. Moreover, pressure-tight joints between dissimilar materials are not required. Still further, sensing of the position of the magnetic end of the movable pin, which produces the electrical signal which is indicative of internal rod pressure, is accomplished without physical contact with the fuel rod interior and thus without fear of breaching the integrity of the fuel rod. Thus improved safety and reliability is obtained.

While our invention has been described in connection with specific embodiments thereof, those skilled in the art will recognize that various modifications are possible within the principles enunciated herein and thus the present invention is not to be limited to the specific embodiments disclosed.

What is claimed is:

1. A fuel element for a nuclear reactor comprising an elongated sealed enclosure containing nuclear fuel, said enclosure including at one end a pressure-tight non-magnetic extension, an indicator pin within the enclosure and having a portion comprising ferromagetic material extending within the said extension, said indicator pin being movable in the elongated direction of the enclosure from a first position to a second position, resilient means connected to the indicator pin for biasing the indicator pin for movement toward the second position, pressure differential means within the enclosure for maintaining the indicator pin in its first position against the force exerted by the resilient means, said pressure differential means being disabled from maintaining the indicator pin in its first position when an opening in the enclosure causes a pressure loss within the enclosure whereby the resilient means displaces the indicator pin to its second position indicative of failed fuel, the pressure-tight extension having a reduced width compared with that of the enclosure portion containing the nuclear fuel, and the ferromagnetic material portion being located entirely within the reduced-width extension at both the first and second positions.

2. A fuel element as claimed in claim 1 and comprising means connected to the indicator pin and forming a pressure-tight seal between the reduced width extension and an enclosure portion, said seal means enabling movement of the indicator pin in response to an enclosure opening.

3. A fuel element as set forth in claim 2 wherein the biasing means comprises a resilient bellows connected at one end to the indicator pin and at its opposite end to an enclosure portion, said bellows also sealing off the reduced width extension from an enclosure portion within the bellows.

4. A fuel element as set forth in claim 3 wherein the enclosure and the extension are constituted of substantially the same material, the bellows and the ferromagnetic portion of the indicator pin are each constituted of a material different from that of the enclosure, the bellows is joined to the enclosure by mechanical means, and the ferromagnetic portion is joined to the indicator pin by mechanical means.

5. A fuel element as set forth in claim 1 in combination with means for sensing the displacement of the indicator pin from its first to its second position, said sensing means comprising a hollow probe containing at least one longitudinally aligned electrical winding and configured to be placed over the said reduced width extension such that the indicator pin ferromagnetic portion is located in a predetermined position relative to the winding when the indicator pin is in its first position, and means connected to the winding for indicating a change in magnetic coupling upon movement of the pin to its second position.

6. A fuel element as set forth in claim 5 wherein the probe is located relative to the ferromagnetic portion by means of a shoulder formed at the transition between the reduced-width extension and the fuel element containment.

7. A fuel element as set forth in claim 5 wherein the probe comprises three longitudinally arranged aligned windings.

8. A fuel element for a nuclear reactor comprising an elongated sealed enclosure containing nuclear fuel, said enclosure including at one end a pressure-tight extension in pressure communication with the enclosure, an indicator pin within the enclosure and having a portion comprising ferromagnetic material extending totally within the said extension, said indicator pin being movable from a first position to a second position, pressure differential means for maintaining the indicator pin in its first position, and resilient means in response to an opening in the enclosure and a subsequent pressure loss and disabling of the pressure differential means causing movement of the indicator pin from its first to its second position so as to indicate a changed fuel condition, in combination with means including a differential transformer for sensing changes in the position of the ferromagnetic material, said pressure-tight extension having an end portion of reduced diameter compared with that of the enclosure portion containing the nuclear fuel for receiving and accommodating and locating the differential transformer with respect to the ferromagnetic material.

9. An assembly of fuel elements as claimed in claim 8 in combination with a hollow differential transformer configured to seat on the reduced diameter end portion of a fuel element while the latter is located within the assembly and containing means which becomes located with respect to the ferromagnetic material for sensing movement thereof.

porated pressure within the bellows enclosed inner chamber 44. Even assuming the fuel element internal pressure is determined by other considerations, it is possible by varying the bellows spring pressure and inner chamber pressure to determine the conditions under which the pin would be moved upwardly when the fuel element integrity is breached.

While it is preferred to provide the failure indicator at the upper end of the fuel element as shown making it possible to sense the position of the indicator pin even while the fuel elements are located in the reactor core, preferably by a multiple sensing system as depicted in our copending application, it is also possible to provide the failure indicator in inverted position at the lower end of the fuel element. The latter arrangement may be preferred for certain PWR installations wherein the lower end of each fuel element is more readily accessed while in the fuel assembly than its upper end. Such assembly configurations often have a removable lower shelf which after removal exposes the lower end of the fuel elements for applications of a sensing element. In this case, it would be necessary to remove the fuel assembly to be tested from the core before applying to its lower end the sensing element. Reversal of the indicator element to the bottom end of the fuel element in no way interfers with its desired mode of operation since the movable pin 30 is under positive pressure or biasing at all times by the bellows spring 27 and can thus operate in the same manner as described above in such inverted position.

In the embodiment of FIG. 1, the movable indicator pin responds to a loss in pressure by moving upward to the position shown in FIG. 1. This displacement is magnetically sensed. A preferred instrument is the LVDT using a probe modified in the following preferred manner. A sensing arm or probe is provided comprising a hollow cylindrical member 50 of non-magnetic material adapted to fit over and accommodate the reduced-diameter extension 22 of the failure indicator. The bottom end 51 of the sensing probe is provided with a taper adapted to engage the tapered shoulder 23 on the indicator. Embedded in the sensing arm member 50 are one or more, preferably three, aligned coil windings 52 spaced apart by a predetermined distance. The coils 52 are also located a predetermined distance from the tapered end 51. The coiled wire ends 53 are connected (not shown) to the instrument proper (also not shown) which in a conventional manner generates when energised a differential voltage proportional to the magnetic coupling between the first and second, and second and third coils, respectively. That magnetic coupling in turn depends upon the linear position of the magnetic member 40 relative to the three coils. The parts are arranged such that there is a significant change in the generated voltage when the magnetic member 40 moves from the failed-fuel position shown in FIG. 1 downward by the amount indicated by arrow 37 to the safe-fuel position. This requires that the indicator sheath is also nonmagnetic, which is the case for zircalloy. While it is preferred to use the tapered shoulder 23 as the locating or reference surface for locating the probe 50 relative to the magnetic member 40, it will also be obvious that the top end 55 of the indicator containment can also be used for this purpose. As will be noted, the outer diameter of the probe is approximately that of the fuel rod. This means that the probe can be applied to the indicator even while the fuel rod is in position within an assembly of fuel rods and thus closely surrounded by neighboring fuel rods. In current designs, the space between fuel rods may be as little as ¼ inch. The reduced diameter section 22 which accommodates the probe thus allows in situ sensing of fuel rods.

FIG. 2 shows a modified form of failure indicator in accordance with the invention. It comprises, similarly to the embodiment of FIG. 1, a corrosive-resistant sheath 60 for the fuel element containing below the usual gas plenum 61 fuel pellets 62 held in place by the usual spring 63. The plenum 61 communicates with a lower chamber 64 which is thus maintained at the internal pressure condition of the fuel rod. The fuel containment 60 is secured as by welding to an indicator containment 66 which extends via a tapered shoulder 67 to a reduced-diameter cylindrical section 68 which pressure-tight encloses a movable indicator pin 70 whose upper end is constituted by a magnetic plug 71 mechanically joined to the pin. The bottom end of the pin forms an enlarged base portion 72. The base portion 72 is permanently secured as by brazing at 73 and 74 to the interior of the indicator containment 66 by means of a corrodible member 75 which undergoes accelerated corrosion when stressed and exposed to moisture. The stress is provided by a spring 76 whose upper end bears against the containment and whose lower end bears against the indicator base 72, constantly urging the pin downward, which downward force is opposed by the corrodible member 75. Should the fuel rod containment be breached, some moisture from the core coolant will enter the fuel rod and thus attack the corrodible member 75. Within a short time, for example a few days, the stressed member 75 will corrode, lose its structural integrity, and fail, allowing the spring 76 to drive the indicator pin downward to its failed-fuel position. The rate of failure depends upon the material of the corrodible member 75, its density, the stress level to which it is subjected, and its ratio of volume to area exposed to the corrosive medium. All of the above variables are controllable. For example, the density can be controlled through powder metallurgical techniques. The stress level can be controlled through the spring preload and the area subject to the stress. The surface to volume ratio can be controlled by adding holes, as shown at 80, and by their number and spacing. The more holes the greater the surface to volume ratio.

Many metals can be chosen for the corrodible member 75, since most metals when stressed and exposed to moisture will corrode at a variety of rates, some very rapid, from internal stress corrosion. Suitable metals, for example, are copper, aluminum, zirconium, and even some stainless steels, such as type 304. The corrosion is accelerated by the presence of water at elevated temperature containing halogens. For instance, iodine is always present in the reactor coolant which is at an elevated temperature. The water at elevated temperature with iodine rapidly attacks the grain boundaries between the metal crystals causing destruction of the metal integrity particularly when stressed. The stress provided by the spring is chosen high enough to achieve this effect. To accentuate the effect by increasing the surface area subject to corrosion, it is preferred to make the corrodible member 75 as a sintered body of low density with connected pores and holes 80 as shown, which makes it easier for the halogen and moisture to gain access to the grain boundaries. As one example, which is not intended to be limiting, the member 75 may be made by compacting powder having an average grain size of 1–30 microns with a pressure of about 5,000–10,000 p.s.i., and then sintering for 2–5 hours at a temperature of 1000°–2000° F. to form a member having a density range of about 40–90%. The exact values are readily chosen to achieve the desired time to failure.

Reference is also made to copending application, Ser. No. 303,549, filed Nov. 3, 1972, by one of us, C. R. Jones, which describes apparatus for providing an early warning of impending failure of a system structural element under load and exposed to a corrosive environment, and which also employs a corrodible member under stress and subject to a corrosive environment. However, in said copending application, the corrodible member is constructed and stressed so as to fail a short time before failure of structural elements of the system so as to provide a warning in advance of system failure. Thus, the corrodible member in the copending application is expected to have a relatively long lifetime, though shorter than that of the structural elements. In the present appli-

10. The combination of claim 9 wherein the ferromagnetic material is a soft magnetic material, and the differential transformer comprises plural longitudinally arranged windings.

11. A fuel element for a nuclear reactor containing an aqueous coolant, comprising an elongated sealed enclosure containing nuclear fuel, said enclosure including at one end a pressure-tight extension, an indicator pin within the enclosure and having a portion comprising ferromagnetic material extending within the said extension, said indicator pin being movable in the elongated direction of the enclosure from a first position to a second position, means connected to the indicator pin for biasing the indicator pin for movement toward the second position, means within the enclosure for maintaining the indicator pin in its first position against the force exerted by the biasing means, said last-named maintaining means in response to an opening in the enclosure being disabled from performing its pin-maintaining function whereby the biasing means displaces the indicator pin to its second position indicative of failed fuel, the maintaining means for the indicator pin comprising a corrodible member joining the indicator pin to the enclosure, said corrodible member being constituted of a metal having the property that it undergoes accelerated corrosion when in a stressed condition and when exposed to moisture, said biasing means being connected to cause said indicator pin to apply a stress to the said corrodible member.

12. A fuel element as set forth in claim 11 wherein the said corrodible member comprises a sintered body of powdered metal.

References Cited
UNITED STATES PATENTS

| | | | |
|---|---|---|---|
| 3,666,625 | 5/1972 | Nybo | 176—80 |
| 3,671,393 | 6/1972 | Williams | 176—68 |

FOREIGN PATENTS

| | | | |
|---|---|---|---|
| 900,348 | 7/1962 | Great Britain | 176—19 R |
| 949,103 | 2/1964 | Great Britain | 176—80 |
| 1,100,723 | 1/1968 | Great Britain | 176—192 D |
| 1,172,708 | 12/1969 | Great Britain. | |

LELAND A. SEBASTIAN, Primary Examiner

R. S. GAITHER, Assistant Examiner

U.S. Cl. X.R.

176—19 LD, 68